(12) United States Patent
Xie et al.

(10) Patent No.: US 10,580,092 B2
(45) Date of Patent: Mar. 3, 2020

(54) RESOURCE TRANSFER SYSTEM AND METHOD

(71) Applicant: TENCENT TECHNOLOGY (SHENZHEN) COMPANY LIMITED, Shenzhen (CN)

(72) Inventors: Zhenli Xie, Shenzhen (CN); Ming Zeng, Shenzhen (CN); Tianqing Huang, Shenzhen (CN); Zhifeng Luo, Shenzhen (CN); Jie Lin, Shenzhen (CN); Sicheng Huang, Shenzhen (CN); Jiajian Xu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 217 days.

(21) Appl. No.: 15/727,124

(22) Filed: Oct. 6, 2017

(65) Prior Publication Data
US 2018/0033096 A1    Feb. 1, 2018

Related U.S. Application Data

(63) Continuation of application No. PCT/CN2016/078210, filed on Mar. 31, 2016.

(30) Foreign Application Priority Data

Apr. 9, 2015 (CN) .......................... 2015 1 0165641

(51) Int. Cl.
*G06F 15/16* (2006.01)
*G06Q 50/00* (2012.01)

(52) U.S. Cl.
CPC .................. *G06Q 50/01* (2013.01)

(58) Field of Classification Search
CPC ...................................................... G06Q 50/01
See application file for complete search history.

(56) References Cited

U.S. PATENT DOCUMENTS

| 9,626,692 B2 * | 4/2017 | Palihapitiya ....... G06Q 30/0251 |
| 2011/0184792 A1 * | 7/2011 | Butcher ................ G06Q 10/10 |
| | | 705/14.13 |

(Continued)

FOREIGN PATENT DOCUMENTS

| CN | 102646055 A | 8/2012 |
| CN | 102654883 A | 9/2012 |

(Continued)

OTHER PUBLICATIONS

Office Action in CN Application No. 201510165641.7 dated Dec. 21, 2015, 7 pages.

(Continued)

*Primary Examiner* — John B Walsh
(74) *Attorney, Agent, or Firm* — Marshall, Gerstein & Borun LLP

(57) ABSTRACT

A method is provided. The method includes: displaying media information which is shared by a Social Networking Service (SNS) platform and released by a second client; displaying an entrance for giving free resources provided by the SNS platform; and in response to an operation for giving free resources triggered through the entrance, sending an instruction for giving free resources for the media information to the SNS platform which transfers a given-free resource from an account of the first client to an account of the second client according to the instruction.

18 Claims, 12 Drawing Sheets

(56) References Cited

U.S. PATENT DOCUMENTS

2013/0067594 A1* 3/2013 Kantor ................ G06F 21/6218
  726/28
2013/0268597 A1  10/2013 van Hoff
2014/0358711 A1* 12/2014 Arbogast ........... G06Q 30/0601
  705/26.1

FOREIGN PATENT DOCUMENTS

| CN | 103412920 A | 11/2013 |
| CN | 103607453 A | 2/2014 |
| CN | 104901864 A | 9/2015 |
| CN | 105337843 A | 2/2016 |
| KR | 10-20120087331 A | 8/2012 |
| KR | 101558131 B1 | 10/2015 |

OTHER PUBLICATIONS

Search Report in International Application No. PCT/CN2016/078210 dated Jun. 24, 2016, 4 pages.
International Preliminary Report on Patentability and Written Opinion in International Application No. PCT/CN2016/078210 dated Oct. 10, 2017, 7 pages.
Office Action in KR Application No. 10-2017-7032551, dated Oct. 8, 2018.

* cited by examiner

RESOURCE TRANSFER SYSTEM AND METHOD

CROSS REFERENCE OF RELATED APPLICATIONS

This application is a continuation of International Application No. PCT/CN2016/078210 filed on Mar. 31, 2016, which claims the priority benefit of a Chinese Patent Application, with App. No. 2015101656417, entitled "SYSTEM AND METHOD FOR INFORMATION INTERACTION", filed on Apr. 9, 2015 at SIPO, the entire content of which is hereby incorporated by reference.

BACKGROUND

The Internet is known as "the fourth media" after the three traditional media, such as newspapers, radio and television. Business users and individual users of the Internet all may use social accounts facing the public to release media information, such as speeches, notifications, topics and network gossips.

When an information publisher sends a piece of media information to multiple information recipients, the recipients may express their agreement or support to the piece of media information by clicking a button of "Like".

SUMMARY

According to an aspect of examples of the disclosure, a method for resource transfer is provided, which is applied to a first client, the method including: displaying media information which is shared by a Social Networking Service (SNS) platform and released by a second client; displaying an entrance for giving free resources provided by the SNS platform; and in response to an operation for giving free resources triggered through the entrance, sending an instruction for giving free resources for the media information to the SNS platform which transfers a given-free resource from an account of the first client to an account of the second client according to the instruction.

According to another aspect of examples of the disclosure, a method for resource transfer is provided, which is applied to a Social Networking Service (SNS) platform, the method including: receiving media information from a first client; publishing the media information; providing an entrance for giving free resources for a second client when the second client displays the media information; receiving an instruction for giving free resources for the media information from the second client which is issued by the second client in response to an operation for giving free resources triggered through the entrance; and in response to the instruction for giving free resources for the media information, transferring a given-free resource from an account of the second client to an account of the first client through a resource-side transfer server.

According to another aspect of examples of the disclosure, a terminal device of a first client is provided, including: one or more processors; and one or more memories storing instructions that, when executed by the one or more processors, cause the first client in the terminal device to perform the following processes: displaying media information which is shared by a Social Networking Service (SNS) platform and released by a second client; displaying an entrance for giving free resources provided by the SNS platform; and in response to an operation for giving free resources triggered through the entrance, sending an instruction for giving free resources for the media information to the SNS platform which transfers a given-free resource from an account of the first client to an account of the second client according to the instruction.

According to another aspect of examples of the disclosure, a Social Networking Service (SNS) platform is provided, including: one or more processors; and one or more memories storing instructions that, when executed by the one or more processors, cause the SNS platform to perform the following processes: receiving media information from a first client; publishing the media information; providing an entrance for giving free resources for a second client when the second client displays the media information; receiving an instruction for giving free resources for the media information from the second client which is issued by the second client in response to an operation for giving free resources triggered through the entrance; and in response to the instruction for giving free resources for the media information, transferring a given-free resource from an account of the second client to an account of the first client through a resource-side transfer server.

According to another aspect of examples of the disclosure, one or more non-transitory computer-readable storage media are provided, which store computer-executable instructions that, when executed by one or more processors of a terminal device, cause a machine to perform any of the above methods.

BRIEF DESCRIPTION OF DRAWINGS

To illustrate the technical solutions of the examples of the present disclosure more clearly, accompanying drawings for describing the examples are introduced briefly hereinafter. Obviously, the accompanying drawings mentioned below are only some examples of the present disclosure; those skilled in this art may obtain other drawings according to the attached drawings without paying any creative labors.

DETAILED DESCRIPTIONS OF EXAMPLES

In order to make purposes, technical solutions and merits of the present disclosure more clearly, the examples of the present disclosure are further described in detail hereinafter with reference to the accompanying drawings.

In the process of realizing the disclosure, the inventor found that the existing technology has at least the following problem: the information recipient is able to express his agreement or support to the information publisher only by clicking the button of "Like", and there are no other ways that can be used by the information recipient to express his agreement or support to the information publisher.

Figure 1:
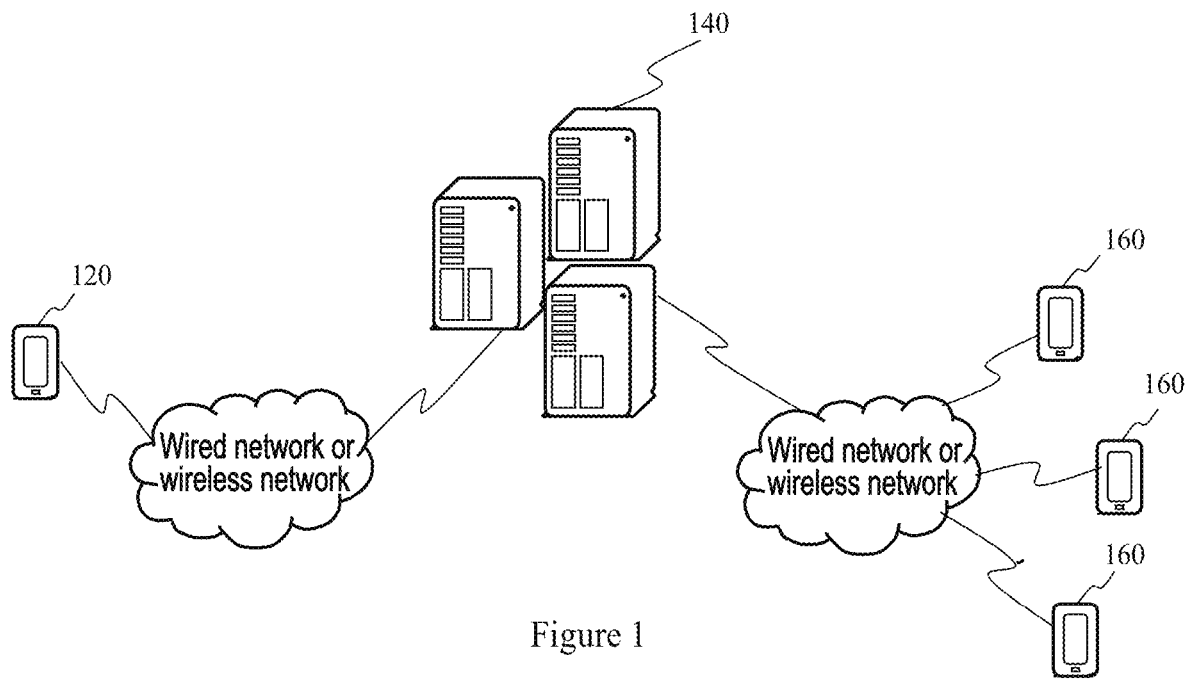
FIG. 1 is a diagram illustrating a structure of the system for resource transfer provided by an example of the present disclosure.

FIG. 1 shows a structure diagram illustrating a system for resource transfer provided by an example of the present disclosure. The system includes: at least one information publisher client 120, an open information platform 140 and at least one information recipient client 160. Wherein:

The information publisher client 120 is an Application (App) provided by the open information platform 140. The information publisher client 120 may be a social application client. The social application client may also be divided into two types of an ordinary account client and a public account client. Wherein, a public account is usually the account facing to the public, used for expressing media information, and registered by an institution or individual with great concern, such as a merchant, an enterprise, a government, a media entity, a celebrity and the like in the open information platform 140; while the ordinary account is the account used for personal social contact and reception of media information registered in the open information platform 140. The information publisher client 120 may release media information, such as a speech, notification, topic, network gossip and the like, to the information recipient client 160 through the open information platform 140. The information publisher client 120 usually needs to run on a mobile terminal used by a user.

The information publisher client 120 communicates with the open information platform 140 through a wired network or wireless network.

The open information platform 140 is a server system used for providing functions of information releasing, information receiving, giving free resources and transfer of accounts to users. As for different media information, the open information platform 140 may include an information server used to provide a background service for the social application, at least one server used to implement a service for giving free resources and so on. The information platform 140 usually includes several servers each of which is used to implement one or more than one function module.

The information recipient client 160 is also an Application (App) provided by the open information platform 140. The information recipient client 160 may be a social application client. Functions of the information recipient client 160 is the same as or similar to those of the information publisher client 120. Similarly, the information recipient client 160 also needs to run on a mobile terminal used by the user. The social application includes but is not limited to at least one of an instant messaging application, a voice communication application, a live application and a dating application.

Figure 2:
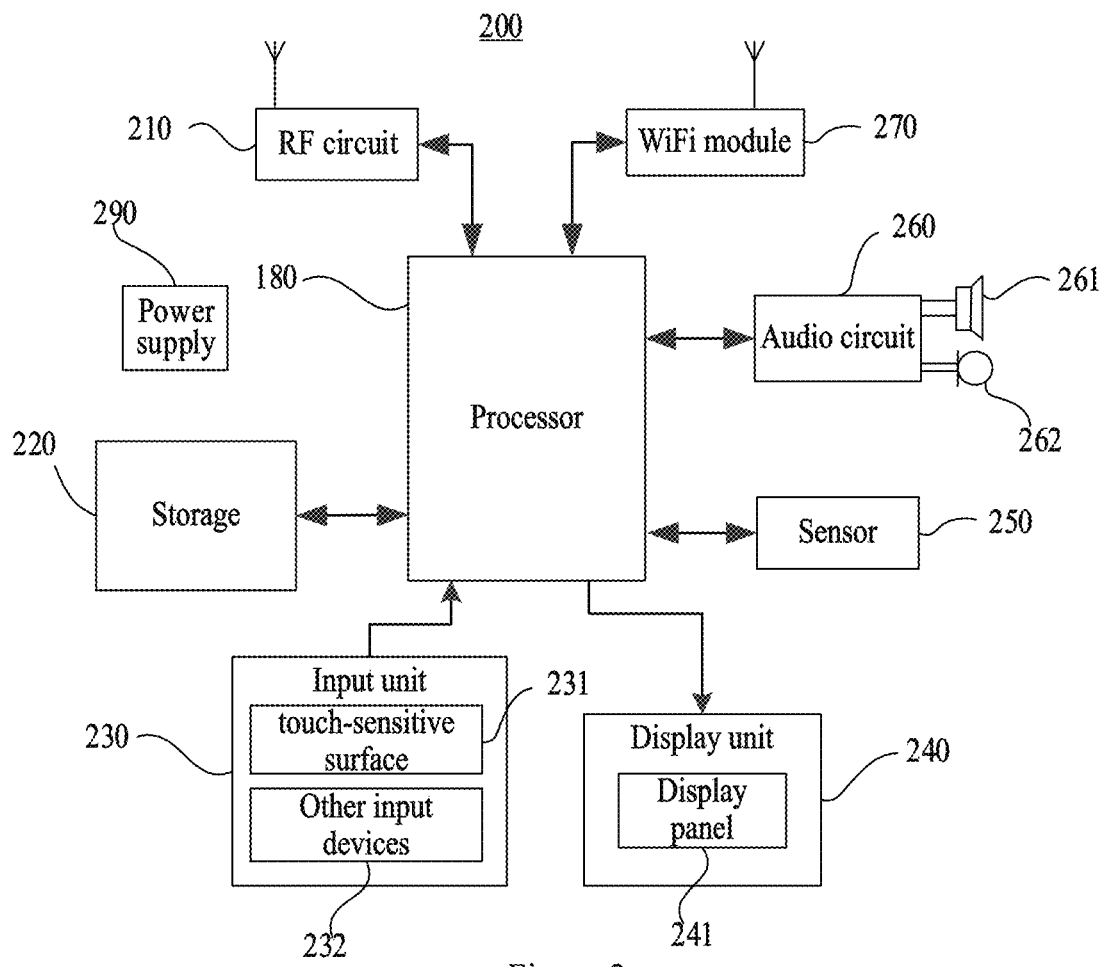
FIG. 2 is a diagram illustrating a structure of the mobile terminal provided by an example of the present disclosure.

FIG. 2 shows a structure diagram illustrating a mobile terminal provided by an example of the present disclosure. The mobile terminal may be used to run the information publisher client 120 or the information recipient client 160.

Specifically, a mobile terminal 200 may include components of an RF (Radio Frequency) circuit 210, a storage 220 including one or more computer-readable storage mediums, an inputting unit 230, a displaying unit 240, a sensor 250, an audio circuit 260, a short-range wireless transmission module 270, a processor 280 including one or more processing cores, a power 290 and etc. The skilled in the art can understand that the mobile terminal is not limited by the structure of the one shown in FIG. 2, but may include more or less components than those shown in FIG. 2, or may combine some components shown in FIG. 2, or may have a component arrangement different from that shown in FIG. 3. Wherein:

The RF Circuit 210 may transmit and receive signals during an information transmitting and receiving process or a call process. Particularly, the RF circuit 210 may receive downlink information from a base station and transmit the downlink information to one or more processors 280. In addition, the RF circuit 210 may transmit uplink data to the base station. Usually, the RF circuit 210 includes, but is not limited to, an antenna, at least one amplifier, a tuner, one or more oscillators, a Subscriber Identity Module (SIM) card, a transceiver, a coupler, a Low Noise Amplifier (LNA), a duplexer etc. In addition, the RF circuit 210 may also communicate with a network and other communication devices through wireless communication. Any of communication standards or protocols may be used in the wireless communication, which include, but are not limited to, Global System of Mobile communication (GSM), General Packet Radio Service (GPRS), Code Division Multiple Access (CDMA), Wideband Code Division Multiple Access (WCDMA), Long Term Evolution (LTE), Email, Short Messaging Service (SMS) etc.

The storage 220 may store software programs and modules. For example, the storage 220 may store a predetermined time list, may also store software programs for collecting voice signals, recognizing keywords, recognizing consecutive voice and configuring event reminders, and may also store binding relationships of wireless access points and user accounts and etc. The processor 280 may execute the software programs and modules stored in the storage 220 to implement a variety of functional applications and data processing. The storage 220 may mainly include a program storage area and a data storage area. The program storage area may store an operation system and an application program for implementing at least one function (e.g., an audio playing function, a video playing function and so on). The data storage area may store data created when the terminal 200 is being used (e.g., audio data, contact data and so on). In addition, the storage 220 may include a high-speed random access memory and a non-transitory memory such as at least one disk storage device, a flash device or a transitory solid-state storage device. Accordingly, the storage 220 may also include a storage controller to provide access to the storage 220 for the processor 280 and the inputting unit 230.

The inputting unit 230 may receive inputted numeral or character information, and generate input signals of a device of user configuration and function control, such as a keyboard, a mouse, an operating lever, optics or a trackball. Specifically, the inputting unit 230 may include a touch sensitive panel 231 and another inputting device 232. The touch sensitive panel 231 is also called a touch screen or a touch pad, and may collect a touch operation performed by a user on or near the touch sensitive panel 231 (e.g., the user performs an operation on or near the touch panel 231 with any suitable object or accessory such as a finger and a touch pen). And the inputting unit 230 may drive a connection device according to a preset program. The touch sensitive panel 231 may include a touch detection apparatus and a touch controller. The touch detection apparatus may detect a touch position of the user, detect a signal generated based on the touch operation, and transmit the signal to the touch controller. The touch controller may receive touch information from the touch detection apparatus, convert the touch information into a touch point coordinate, transmit the touch point coordinate to the processor 280, and receive and execute a command sent by the processor 280. In addition, the touch sensitive panel 231 may be implemented by multiple modes such as a resistive mode, a capacitive mode, an infrared mode or a surface acoustic wave mode. Besides the touch sensitive panel 231, the inputting unit 230 may further include another inputting device 232. Specifically, the inputting device 232 may include, but is not limited to, at least one of a physical keyboard, a function key (such as a volume control key, a switch key etc.), a trackball, a mouse and an operating lever.

The displaying unit 240 may display information inputted by the user or information provided to the user and various graphical user interfaces of the mobile terminal 200. The graphical user interfaces may be constructed by graphics, texts, icons, videos, and any combination thereof. The displaying unit 240 may include a displaying panel 241, optionally, which may be configured by a Liquid Crystal Display (LCD) and an Organic Light-Emitting Diode (OLED). Furthermore, the displaying panel 241 may be covered with the touch sensitive panel 231. When detecting a touch operation on or near the touch sensitive panel 231, the touch sensitive panel 231 transmits the touch operation to the processor 280 to determine a type of a touch event. Afterwards, the processor 280 provides a video output on the displaying panel 241 according to the type of the touch event. Although the touch sensitive panel 231 and the displaying panel 241 are illustrated as two independent components to implement an inputting function and an outputting function respectively in FIG. 2, in some examples, the touch sensitive panel 231 and the displaying panel 241 may be integrated to implement the inputting function and the outputting function.

The mobile terminal 200 may further include at least one sensor 250, such as a light sensor, a motion sensor and another kind of sensor. Specially, the light sensor may include an ambient light sensor and a proximity sensor. The ambient light sensor may adjust the brightness of the displaying panel 241 according to the brightness of ambient light. The proximity sensor may close the displaying panel 241 and/or become backlit when the mobile terminal 200 is moved to an ear. As one kind of motion sensor, a gravity accelerometer sensor can detect a value of acceleration on all directions (typically three-axis). The gravity accelerometer sensor may detect the value and direction of gravity in stationary, identify a posture of a mobile phone (such as switch between a horizontal screen and a vertical screen, a related game, magnetometer posture calibration and so on), and implement a vibration-recognition-related function (such as a pedometer and a percussion). Another sensor such as a gyroscope, a barometer, a hygrometer, a thermometer and an infrared sensor may be configured in the terminal 200, which will not be repeated herein.

The audio circuit 260, the speaker 221 and the microphone 222 may provide an audio interface between the user and the terminal 200. The audio circuit 260 may transmit to the speaker 221 an electric signal transformed from received audio data. The speaker 221 transforms the electric signal to a sound signal and outputs the sound signal. On the other hand, the microphone 222 transforms the collected sound signal to an electric signal. The audio circuit 260 receives the electric signal, transforms the electric signal to audio data, and outputs the audio data to the processor 280. After the audio data is processed by the processor 280, the audio data is transmitted to another mobile terminal via the RF circuit 210, or is outputted to the storage 220 for further processing. The audio circuit 260 may also include a headset jack to provide communication between peripheral headset and the terminal 200.

The short-range wireless transmission module 270 may be a WiFi (wireless fidelity) module or a Bluetooth module. The terminal 200 may help a user transmit and receive an Email, browse a webpage and access streaming media through the short-range wireless transmission module 270. The short-range wireless transmission module 270 may provide the user with an access to a wireless broadband internet. Though the short-range wireless transmission module 270 is shown in FIG. 2, in a particular application, the terminal 200 may not include the short-range wireless transmission module 270 which may be omitted as demanded without changing the substantial scope of the disclosure.

The processor 280 is a control center of the terminal 200. The processor 280 is connected with all components of the mobile phone via various interfaces and circuits, and may implement various functions and data processing of the terminal 300 through operating or executing the software programs and/or modules stored in the storage 220 and invoking data stored in the storage 220, thereby overall monitoring the terminal 200. Optionally, the processor 280 may include one or more processing cores. Optionally, the processor 280 may include an application processor and a modem processor. The application processor may mainly process an operation system, a user interface and application programs etc. The modem processor may mainly process wireless communications. It can be understand that the above processor 280 may also not include the modem processor.

The terminal 200 may further include an electric power 290 (e.g., battery) supplied electricity to each component, optionally, the electric power may be connected with the processor 280 through a power management system, so as to manage such functions as charging, discharging and power consumption through the power management system. The power 290 may also include one or more Direct Current (DC) or Alternating Current (AC) powers, a recharging system, a power failure detection circuit, a power converter or an inverter, a power status indicator and etc.

The terminal 200 may further include a camera and a Bluetooth module, which is not shown in FIG. 2 and will not be further described herein.

The mobile terminal 200 also may include a memory, and one or more programs, wherein, the one or more programs are stored in the storage, and are configured to be executed by one or more processors.

The terminal 300 may further include a storage, one or more programs are stored in the storage, and are configured to be executed by the one or more processors.

Figure 3:
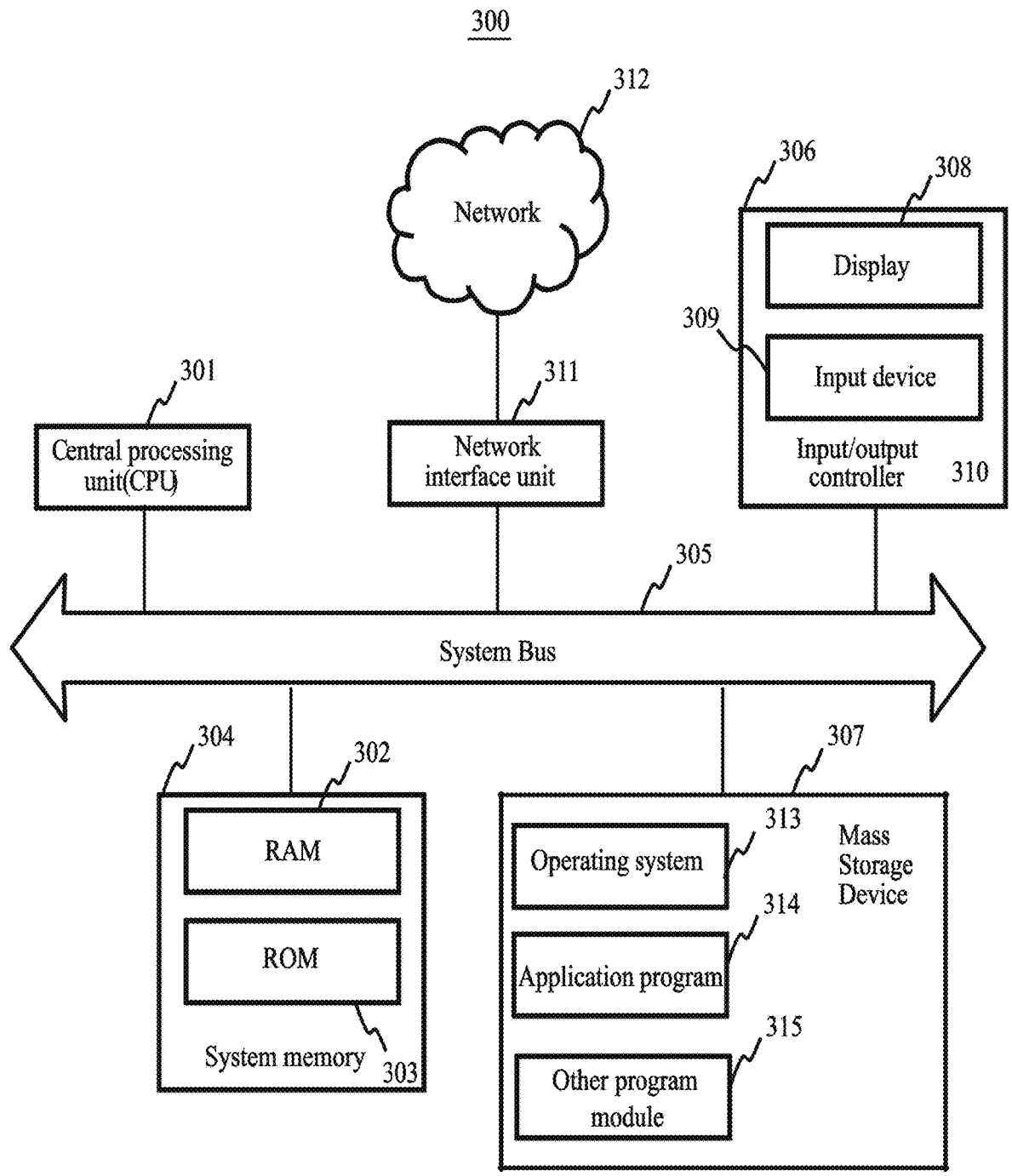
FIG. 3 is a diagram illustrating a structure of the server provided by an example of the present disclosure.

FIG. 3 shows a structure diagram of a server provided by an example of the present disclosure. The server may be a server in the open information platform 140.

Specifically, the server 300 includes a central processing unit (CPU) 301, a system memory 304 including a random access memory (RAM) 302 and a read only memory (ROM) 303, and a system bus 305 connecting the system memory 304 with the central processing unit 301. The server 300 also includes a basic input/output system (I/O system) 306 for helping devices in the computer transmitting information with each other, and a mass storage device 307 for storing the operating system 313, application program 314 and other program module 315.

The basic input/output system 306 includes a display 308 for displaying information and an input device 309 for inputting information of the user, such as a mouse and a keyboard. The display 308 and input device 309 are connected to the central processing unit 301 through an input/output controller 310 connected to the system bus 305. The basic input/output system 306 may also include an input/output controller 310 for receiving and processing inputs from a plurality of devices such as a keyboard, a mouse, electronic touch-control pen or etc. Similarly, the input/output controller 310 may also provide output to a display, a printer, or other types of output devices.

The mass storage device 307 may connect to the central processing unit 301 by a large capacity memory controller (not shown) which is connected with the system bus 305. The mass storage device 307 and a related computer readable medium may provide nonvolatile storage for the server 300. That is, the mass storage device 307 may include a computer readable medium (not shown), such as a hard disk or a CD-ROM driver or the like.

Without loss of generality, the computer readable medium may include a computer storage medium and a communication medium. The computer storage medium includes a transitory and non-transitory medium, removable and non-removable medium for storing computer readable instructions, data structures, program modules or other data of any method or technical implementation. The computer readable storage medium includes RAM, ROM, EPROM, EEPROM, flash memory or other solid-state storage technology, CD-ROM, DVD or other optical storage, cassette, magnetic tape, disk storage or other magnetic storage devices. Of course, the skilled in the art can know that the computer storage medium is not limited to the above. The system memory 304 and the mass storage device 307 can be collectively called storage.

According to various examples of the present disclosure, the server 300 may also connect with a remote computer to run thereon via a network, such as the Internet. That is the server 300 may connect the network 312 through the network interface unit 311 which is connected with the system bus 305, and alternatively, it may use the network interface unit 311 to connect with other types of network or a remote computer system (not shown).

The storage above further includes one or more programs which are stored in the storage and are configured to be executed by the CPU.

The information publisher client 120 is used to release media information to the open information platform 140. The form of the media information includes, but is not limited to, at least one of the following: a text message, a picture message, a voice message and a page with an external link pushed by a public accounts. For example, referring to FIG. 4A, the information publisher client 120 is a client 42 used by a public account in a social application, and the media information is an original network article 44 edited by the public account.

The open information platform 140 is used to share the media information to several information recipient clients 160, and to provide an entrance for giving free resources of the media information to the information recipient clients 160. The given-free resources may be virtual resources or cash resources, and the virtual resources may be at least one of virtual gifts, virtual currency and virtual credits.

The information recipient client 160 is used to display the media information and an entrance for giving free resources, and based on an operation for giving free resources triggered by the entrance, to send an instruction for giving free resources for the media information to the open information platform. The entrance for giving free resources may be a link, and may be displayed as a button control by the information recipient client. For example, referring to FIG. 4B, the information recipient client 46 is a social application client, the information recipient client 46, while displaying media information 44, displays a button control for giving free resources 48 below its text. After reading the media information 44, if an information recipient accepts or agrees with the media information 44, he can click button control for giving free resources 48 to trigger the information recipient client 160 to send an instruction for giving free resources to the open information platform 140.

The open information platform 160 is used to transfer a given-free resource from an account of an information recipient client 160 which has sent the instruction for giving free resources to an account of the information publisher client 120 in accordance with the instruction for giving free resources.

Optionally, the open information platform 160 may be further used to provide user information of the information recipient client which has sent the instruction for giving free resources for the information publisher client 120. The user information may include at least one of an avatar, a user name, the gender, a personal signature and a personal space.

The information publisher client 120 is used to display user information, and to send a first communication message to the information recipient client which has sent the instruction for giving free resources according to the user information. The information publisher client 120 may display the user information of the information recipient client 160 which has sent the instruction for giving free resources in a user interface where the media information is. The user information may be an avatar.

Figure 4A:
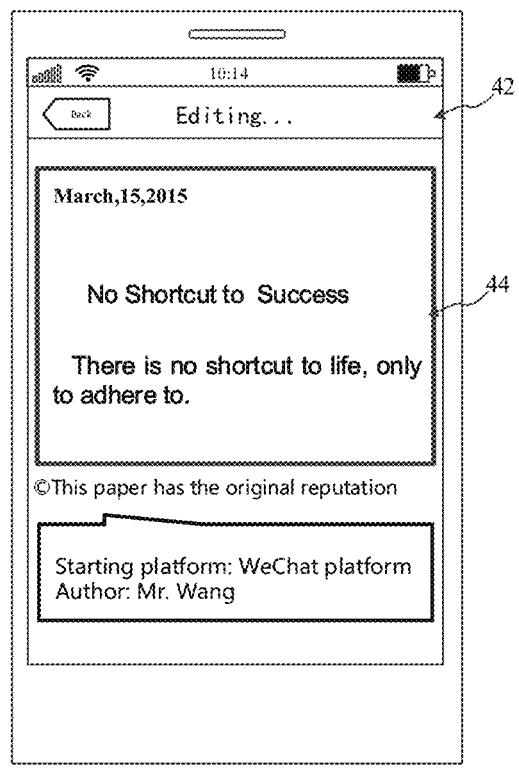
FIGS. 4A to 4F are diagrams illustrating user interfaces when the system for resource transfer provided by an example of the present disclosure is on working.
Figure 4B:
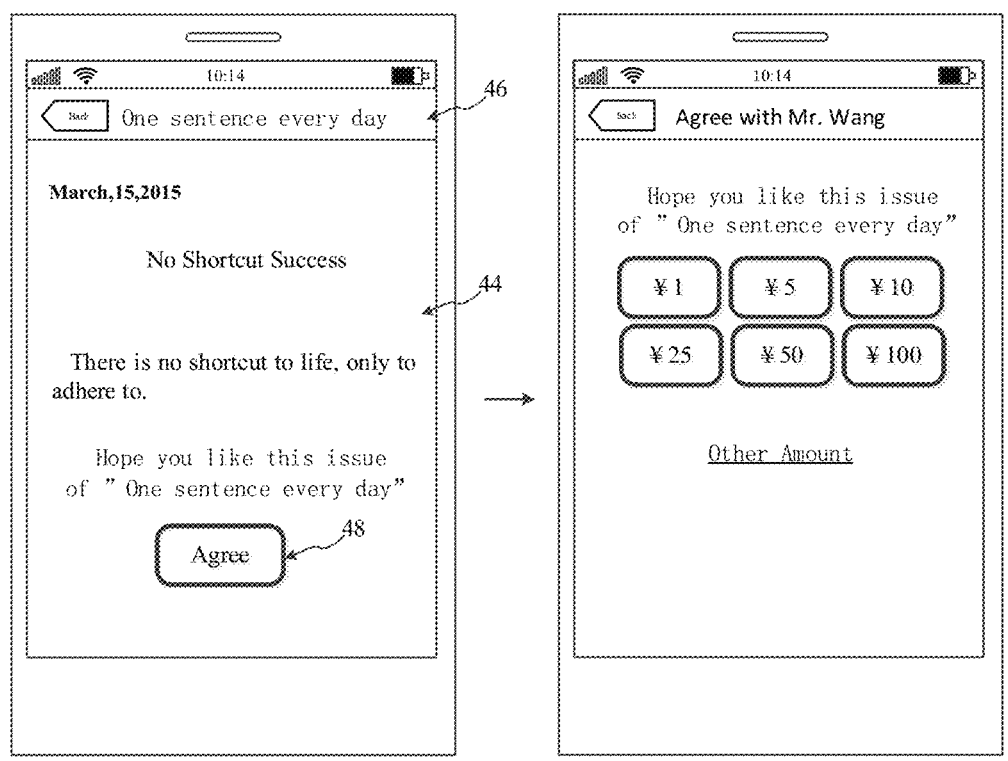
Figure 4C:
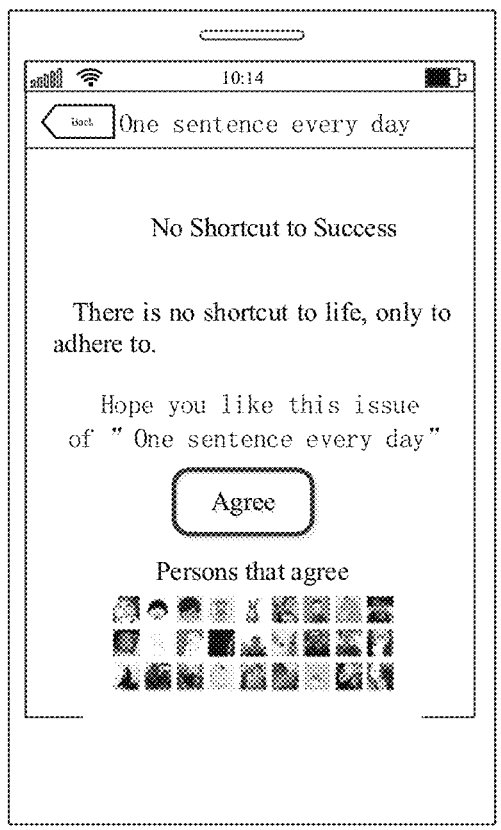

For example, referring to FIG. 4C, when a recipient Mr. Zhang agrees with the media information 44, the open information platform 160 sends user information of Mr. Zhang to the information publisher client 120. The information publisher client 120 displays the user information of Mr. Zhang in an area "Persons that agree". The information publisher client 120 may display three lines of avatars of the information recipient clients 160 that have sent the instruction for giving free resources, and each line has 9 avatars. And, the user information of the clients 160 is displayed in the area "Persons that agree" in turn from left to right and from top to bottom in accordance with a time order for sending the instruction for giving free resources from late to early.

Figure 4D:
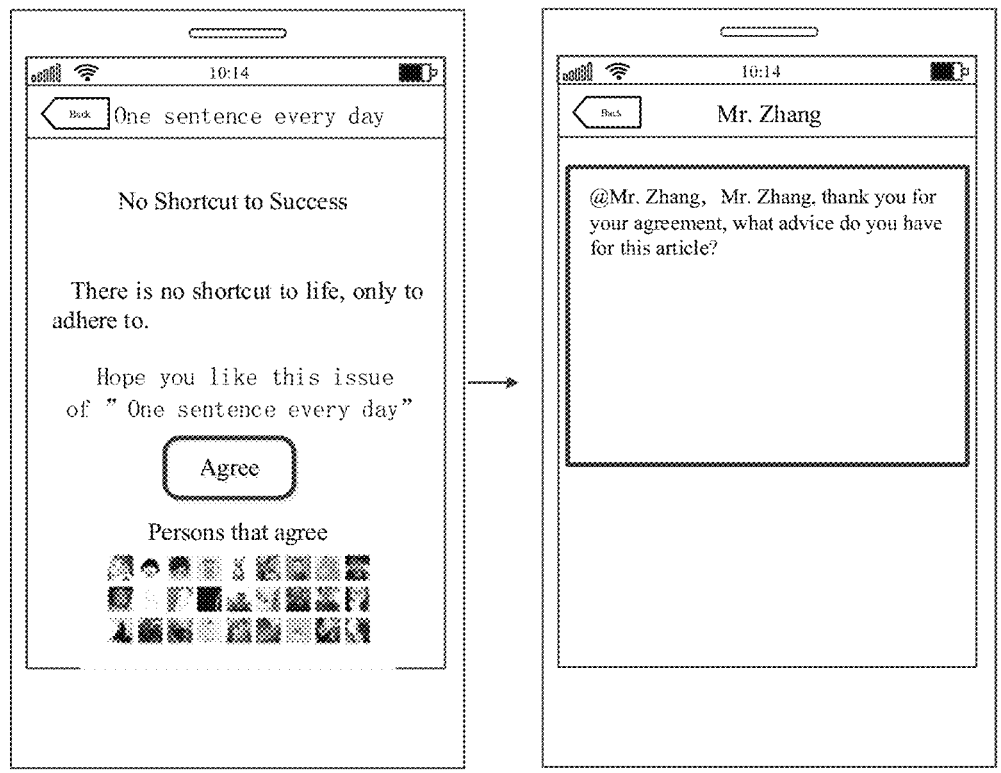

Referring to FIG. 4D, if Mr. Wang as the information publisher wants to communicate deeper with Mr. Zhang, Mr. Wang sends a first communication message of "Mr. Zhang, thank you so much for your appreciation, what advice do you have for this article?" through the information publisher client 120 to the information recipient client 160. The first communication message is forwarded through the open information platform 160, to the information recipient client 160.

The information recipient client 160 is used for receiving the first communication message and displaying this message. For example, the information recipient client 160 of Mr. Zhang receives and displays the first communication message of "Mr. Zhang, thank you for your appreciation, what advice do you have for this article?". The information recipient client 160 of Mr. Zhang may also continue to make a response and communicate based on the first communication message.

To sum up, the system for resource transfer provided by the present example can solve the problem that the information recipient is only able to express his agreement or support to the information publisher by clicking the button of "Like", and there is no other way that can be used by the information recipient to express his appreciation or support to the information publisher, through the entrance for giving free resources provided with the information recipient client by the open information platform, by which the information recipient client can send a given-free resource to the information publisher, so that the effect that the information recipient client is able to express his agreement or support to the media information of the information publisher through giving free virtual resources or cash resources can be achieved.

In an optional example, the first communication message and a reply message may only be received and displayed by the information publisher client 120 and the current information recipient client 160, the other information recipients who have sent the given-free resource don't receive and display the first communication message. But in another optional example, the first communication information and the reply message may also be sent to all the information recipient clients which have sent the instruction for giving free resources to be displayed thereon, that is, the other information recipient clients which have sent the instruction for giving free resources may also receive and display the first communication message and the reply message between the information publisher client and the current information recipient client which has sent the instruction for giving free resources, so that the other information recipient clients which have sent the instruction for giving free resources may also participate in the current information interaction.

In order to realize the interaction between various information recipient clients which have sent the instruction for giving free resources, the open information platform 140 is further used to provide with a first information recipient client and a second information recipient client which have sent the instruction for giving free resources their user information between each other. In other words, an information recipient client which has sent the instruction for giving free resources may receive and display the user information of another information recipient client which has sent the instruction for giving free resources, and its display user interface is similar with that shown in FIG. 4C.

The first information recipient client 160 is used for sending a second communication message to a second information recipient client based on the user information of the second information recipient client. If the first information recipient Mr. Zhang wants to communicate deeper with the second information recipient Mr. Li, Mr. Zhang sends a second communication message of "Mr. Li, you do feel it is good ah?" to the second information recipient client 160 of Mr. Li through the first information recipient client 120. The second communication message is forwarded through the open information platform 140, to the second information recipient client 160.

Figure 4E:
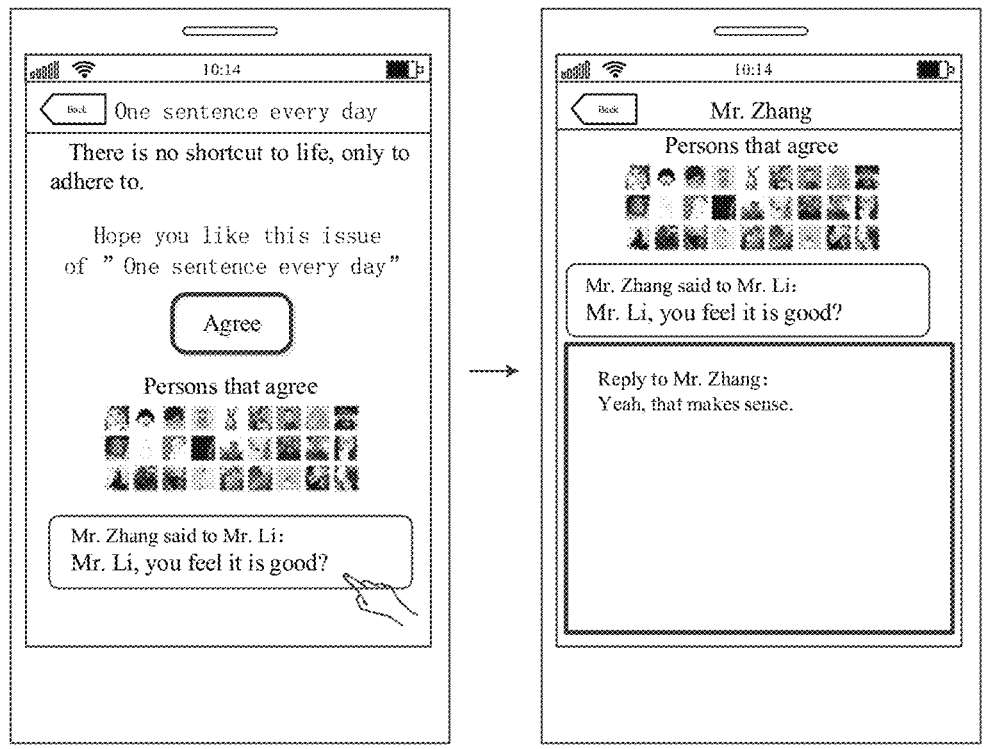

The second information recipient client 160 is used for receiving and displaying the second communication message. The second information recipient client 160 of Mr. Li may further continue to make a response and communicate based on the second communication message as shown in FIG. 4E.

In this way, the various information recipient clients 160 which have sent the instruction for giving free resources can achieve a deeper information interaction. By the operation of giving free resources, aggregation of users can be achieved. Since the various information recipients who have sent the instruction for giving free resources all agree with or support the media information released by the information publisher, they have the same view or position, and are more likely to resonate with each other, to achieve more effective communication. However, there may be a friend relationship between theses information recipients or there may be no friend relationship between them.

In an optional example, the second communication message and the reply message can only be received and displayed by the first information recipient client 160 and the second information recipient client 160. But in another optional example, the second communication information and the reply message, at the same time, are further sent to the information publisher client 120 and the other information recipient clients 160 which have sent the instruction for giving free resources to be displayed thereon. That is, the information publisher client 120 and the other information recipient clients 160 which have sent the instruction for giving free resources may also get the information interaction between the first information recipient client 160 and the second information recipient client 160.

In another optional example, whether or not to provide the entrance for giving free resources for the media information is an optional function of the information publisher client.

The information publisher client 120 is used for sending an entrance providing indication to the open information platform according to a received selection operation when releasing the media information. For example, referring to FIG. 4F, the information publisher client 120 displays an optional control 43 in a user interface for editing information when releasing the media information. When the information publisher needs to provide the entrance for giving free resources, he selects the optional control 43, while when the information publisher does not need to provide the entrance for giving free resources, he does no select the optional control 43. When the optional control 43 is selected, when the information publisher client 120 releases the media information, at the same time, it sends the entrance providing indication to the open information platform 140.

The open information platform 140 is used to provide the entrance for giving free resources for the media information to the information recipient client after receiving the entrance providing indication. The entrance for giving free resources may be a link, and the open information platform 140 provides the link at the same time when providing the media information to the information recipient client. The information recipient client 160 displays the link as a button for giving free resources.

Figure 5:
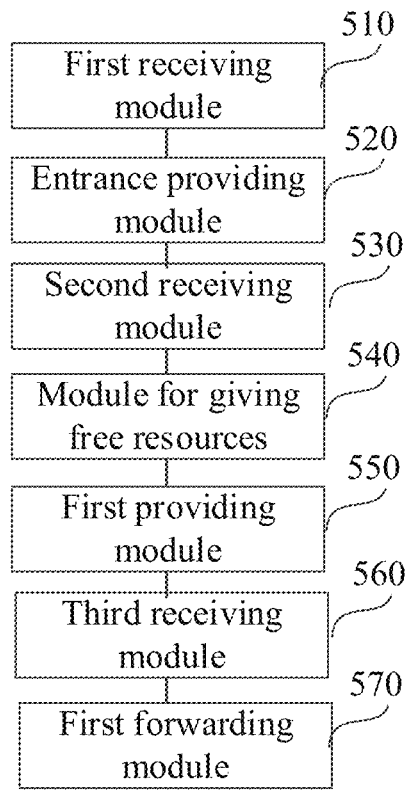
FIG. 5 is a block diagram illustrating a structure of the open information platform provided by an example of the present disclosure.

FIG. 5 shows a block diagram illustrating a structure of an open information platform provided by an example of the present disclosure. The open information platform 500 includes a first receiving module 510, an entrance providing module 520, a second receiving module 530, a module for giving free resources 540, a first providing module 550, a third receiving module 560 and a first forwarding module 570.

The first receiving module 510 is configured to receive media information released by an information publisher client.

The entrance providing module 520 is configured to share the media information to a plurality of information recipient clients, and to provide an entrance for giving free resources for the media information to the information recipient clients.

The second receiving module 530 is configured to receive an instruction for giving free resources for the media information sent by the information recipient client.

The module for giving free resources 540 is configured to transfer a given-free resource from an account of the information recipient client which has sent the instruction for giving free resources to an account of the information publisher client according to the instruction for giving free resources.

Optionally, the first providing module 550 is configured to provide user information of the information recipient client which has sent the instruction for giving free resources for the information publisher client.

The third receiving module 560 is configured to receive a first communication message sent to the information recipient client which has sent the instruction for giving free resources by the information publisher client according to the user information.

The first forwarding module 570 is configured to forward the first communication message to the information recipient client.

Figure 6:
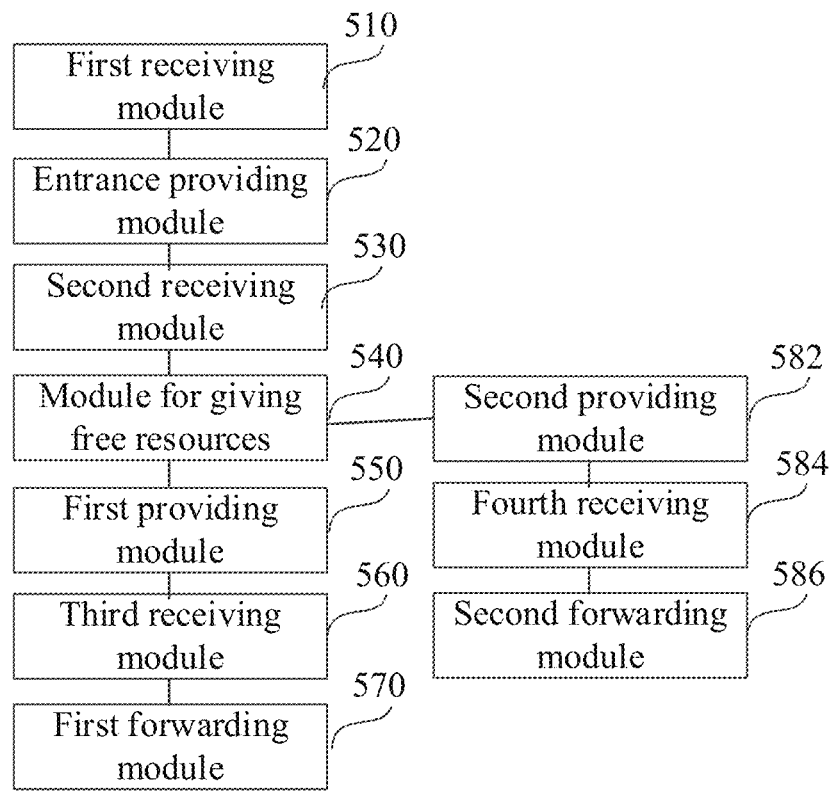
FIG. 6 is a block diagram illustrating a structure of the open information platform provided by another example of the present disclosure.

In an optional example, the open information platform 500 further includes a second providing module 582, a fourth receiving module 584 and a second forwarding module 586 as shown FIG. 6.

The second providing module 582 is configured to provide with a first information recipient client and a second information recipient client which have sent the instruction for giving free resources their user information between each other.

The fourth receiving module 584 is configured to receive a second communication massage sent to the second information recipient client by the first information recipient client according to the user information of the second information recipient client.

The second forwarding module 586 is configured to forward the second communication massage to the second information recipient client.

In an optional example, the entrance providing module 520 is configured to provide the entrance for giving free resources to the information recipient client when receiving the entrance providing indication.

Figure 7:
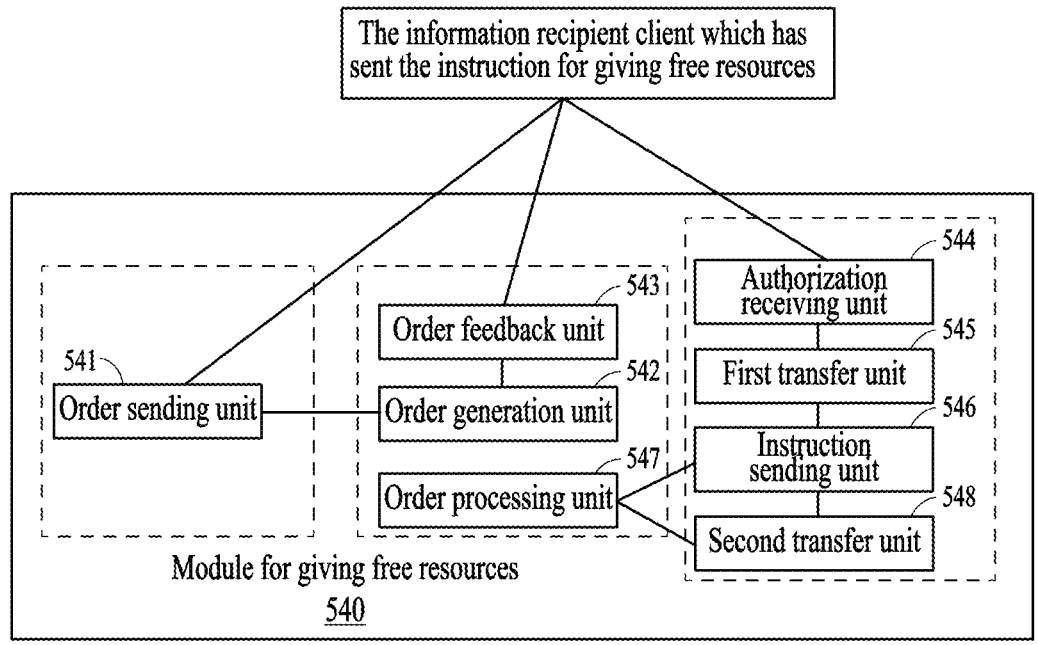
FIG. 7 is a block diagram illustrating a structure of the open information platform provided by another example of a present disclosure.

In an optional example shown in FIG. 7, the module for giving free resources 540 includes:

An order sending unit 541, configured to send an instruction for placing an order to a transfer unit at an information side after receiving the instruction for giving free resources.

An order generation unit 542, configured to generate an order according to the instruction for placing an order, where the order is for transferring a given-free resource from an account of the information recipient client which has sent the instruction for giving free resources to an account of the information publisher client in real time.

An order feedback unit 543, configured to feed back the order to the information recipient client which has sent the instruction for giving free resources.

An authorization receiving unit 544, configured to receive an authorization instruction for an order that is sent by the information recipient client, where the authorization instruction is used for authorizing implementation of resource transfer of the order.

A first transfer unit 545, configured to transfer the given-free resource from the account of information recipient client which has sent the instruction for giving free resources to an intermediate account according to the authorization instruction.

An instruction sending unit 546, configured to send an order processing instruction to an order processing unit.

The order processing unit 547, configured to process the order according to the order processing instruction, and to send an instruction indicating that the order has been processed to a second transfer unit.

The second transfer unit 548, configured to transfer the given-free resource from the intermediate account to the account of the information publisher client according to the instruction indicating that the order has been processed.

But it should be noted that, in the description above, the term "module" or the term "unit" refers to a computer logic used to provide a designated function, which can be implemented by hardware, firmware and/or software. The division of various function modules in the examples above is only giving an illustration, in practical application, the functions above can be assigned to different function modules or different hardware devices to be implemented according to demands, where each hardware device is to implement one or more function modules. That is, the internal structure of the device is divided into different function module to complete all or part of the functions described above.

Figure 8:
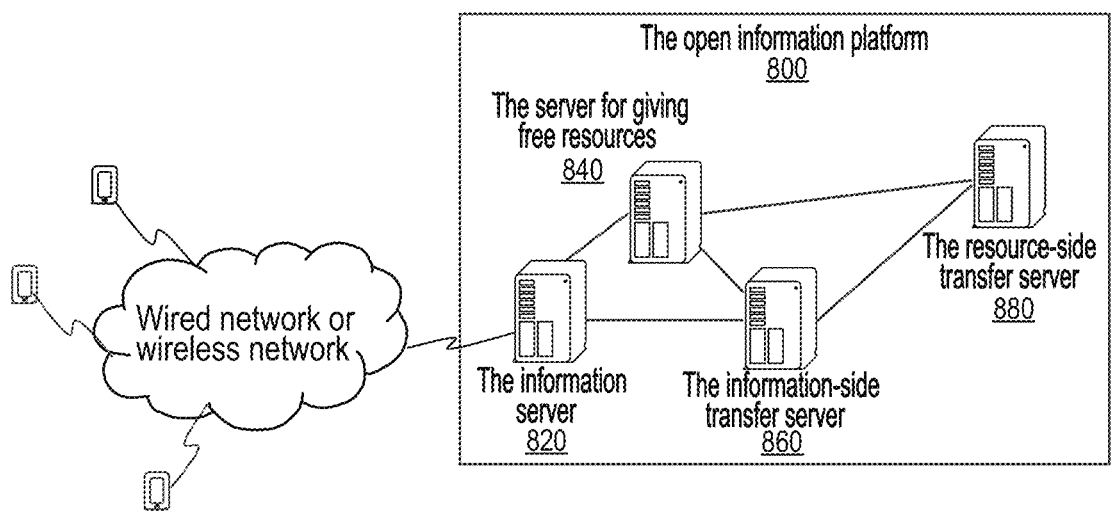
FIG. 8 is a block diagram illustrating a structure of the open information platform provided by another example of the present disclosure.

For example, in the optional example shown in FIG. 8, the open information platform includes an information server 820, a server for giving free resources 840, an information-side transfer server 860, and a resource-side transfer server 880.

The information server 820 is used for implementing the functions of the first receiving module 510 and the entrance providing module 520, the first providing module 550, the third receiving module 560, the first forwarding module 560, the second providing module 582, the fourth receiving module 584, and the second forwarding module 586.

The server for giving free resources 840 is used to realize the functions of the second receiving module 530 and the order sending unit 541.

The information-side transfer server 860 is used to realize the functions of the order feedback unit 543 and the order processing unit 547.

The resource-side transfer server 880 is used to realize the functions of the authorization receiving unit 544, the first transfer unit 545, the instruction sending unit 546 and the second transfer unit 548.

It should be noted that, the server for giving free resources 840, the information-side transfer server 860 and the resource-side transfer server 880 may be realized by a server cluster for giving free resources, there may be one or more servers in the server cluster, which will not be limited by the example of the present disclosure.

In a specific example, the information publisher client is a client using a public account A maintained by an enterprise or individual among WeChat clients which is produced by Tencent China company, and the information recipient client is a client using an ordinary account which follows the public account A among the WeChat clients. The information server 820 is a server for implementing communications at WeChat background, the server for giving free resources

840 is a server for implementing the function of giving free resources at the WeChat background, the information-side transfer server 860 is a server for implementing the function of account transfer at the WeChat background, and the resource-side transfer server 880 is a server for implementing the function of account transfer at Tenpay background. Due to the WeChat background and the Tenpay background belonging to different subsidiaries, the information-side transfer server 860 and the resource-side transfer server 880 realizes function docking in the whole process of account transfer. The information server 820, the server for giving free resources 840 and the information-side transfer server 860 all belong to the WeChat background which is a kind of Social Networking Service (SNS) platform. So, in some examples, the open information platform includes an SNS platform (including the severs 820, 840 and 860) and the resource-side transfer server 880.

Figure 9:
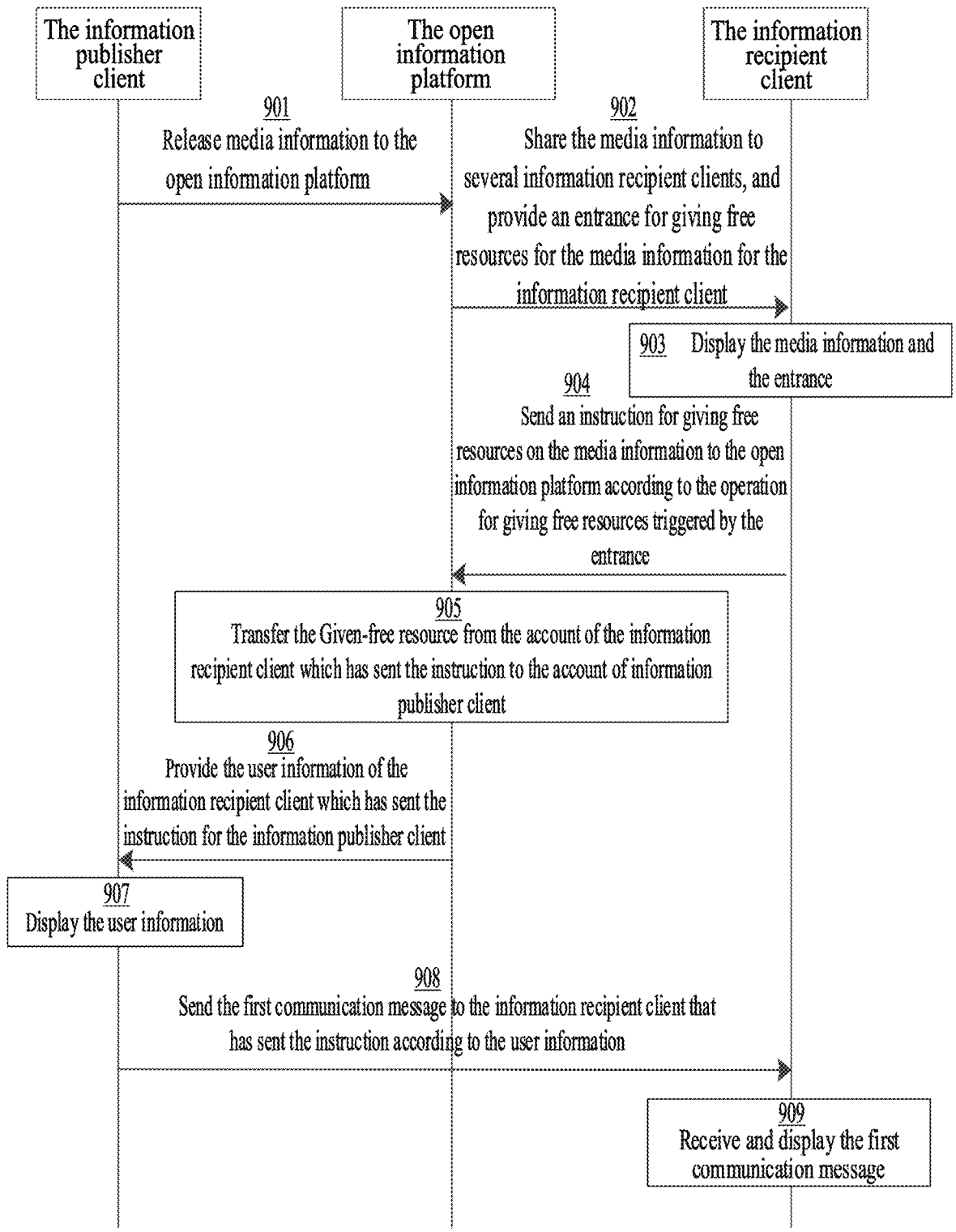
FIG. 9 is a flowchart illustrating the method for resource transfer provided by an example of the present disclosure.

FIG. 9 shows a flow chart illustrating the method of resource transfer provided by an example of the present disclosure. The example takes the method applied in the system shown in FIG. 1 as an example, and the method includes the following steps:

At Step 901, the information publisher client releases media information to the open information platform.

The form of the media information includes, but is not limited to, at least one of a text message, a picture message, a voice message and a page with an external link pushed by a public account.

For example, referring to FIG. 4A, the information publisher client 120 is the client 42 using a public account maintained by an enterprise or individual of the social applications, the media information is an original network article 44 edited by the public account.

At Step 902, the open information platform shares the media information to several information recipient clients, and provides an entrance for giving free resources for the media information to the information recipient clients.

In various examples, the several information recipient clients may be those following the information publisher client, or those selected randomly, or those determined according to a forwarding rule or recommendation rule, which will not be limited by the example of the present disclosure.

The open information platform shares the media information to several information recipient clients, and provides an entrance for giving free resources of the media information to the information recipient clients. The entrance for giving free resources may be a link, and may be displayed as a button control by the information recipient client.

Correspondingly, the information recipient client receives the media information and the entrance for giving free resources.

At Step 903, the information recipient client displays the media information and the entrance for giving free resources.

The Information recipient client may display the media information and the entrance for giving free resources based on a HTML5 (Markup Language Hyper Text 5, super text markup language Fifth Edition) page, as shown in FIG. 4B.

At Step 904, the information recipient client sends an instruction for giving free resources for the media information to the open information platform according to an operation for giving free resources triggered by the entrance for giving free resources.

After the current information recipient reads the media information 44, if he accepts or agrees with the media information, he may click a button control for giving free resources to trigger the information recipient client to send the instruction for giving free resources to the open information platform.

Correspondingly, the open platform receives the instruction for giving free resources for the media information.

At Step 905, the open information platform transfers a given-free resource from an account of the information recipient client which has sent the instruction for giving free resources to an account of the information publisher client.

The given-free resource may be a virtual resource or cash resource.

The amount of the given-free resource may be preconfigured by a system or defined by a user.

At Step 906, the open information platform provides user information of the information recipient client which has sent the instruction for giving free resources to the information publisher client.

The user information may include at least one of an avatar, a user name, the gender, a personal signature and a personal space.

For example, when the information recipient, Mr. Zhang, gifts a cash resource for the media information, the open information platform may send the user information of Mr. Zhang to the information publisher client.

At Step 907, the information publisher client displays the user information.

For example, referring to FIG. 4C, the information publisher client displays the user information of Mr. Zhang in an area of "Persons that agree". The information publisher client may display three lines of avatars of the information recipient clients 160 which have sent the instruction for giving free resources, and each line has 9 avatars. And, the user information of the clients is displayed in the area "Persons that agree" in turn from left to right and from top to bottom in accordance with a time order for sending the instruction for giving free resources from late to early.

At Step 908, the information publisher client sends a first communication message to the information recipient client that has sent the instruction for giving free resources according to the user information.

The information publisher client sends the first communication message to the open information platform while taking the information recipient client which has sent the instruction for giving free resources as a destination address according to the user information. And the open information platform forwards the first communication message to the current information recipient client corresponding to the user information.

For example, referring to FIG. 4D, if the information publisher Mr. Wang wants to communicate with Mr. Zhang deeper, Mr. Wang sends a first communication message of "Mr. Zhang, thank you so much for your given-free resource, what advice do you have for this article?" through the information publisher client to the information recipient client of Mr. Zhang. The first communication message is forwarded through the open information platform to the information recipient client.

At Step 909, the information recipient client receives and displays the first communication massage.

For example, the information recipient client 160 of Mr. Zhang receives and displays the first communication message of "Mr. Zhang, thank you for your appreciation, what advice do you have for this article?". The information recipient client 160 of Mr. Zhang may further continue to make a response and communicate based on the first communication message.

To sum up, the method for resource transfer provided by the present example can solve the problem that the information recipient is only able to express his agreement or support to the information publisher by clicking the button of "Like", and there is no other way that can be used by the information recipient to express his appreciation or support to the information publisher, through the entrance for giving free resources provided with the information recipient client by the open information platform, by which the information recipient client can send a given-free resource to the information publisher, so that the effect that the information recipient client is able to express his agreement or support to the media information of the information publisher through giving free virtual resources or cash resources can be achieved.

In an optional example, the first communication message and a reply message may only be received and displayed by the information publisher client 120 and the current information recipient client 160, the other information recipients who have sent the given-free resource don't receive and display the first communication message. But in another optional example, the first communication information and the reply message may also be sent to all the information recipient clients which have sent the instruction for giving free resources to be displayed thereon, that is, the other information recipient clients which have sent the instruction for giving free resources may also receive and display the first communication message and the reply message between the information publisher client and the current information recipient client which has sent the instruction for giving free resources, so that the other information recipient clients which have sent the instruction for giving free resources may also participate in the current information interaction.

Figure 10:
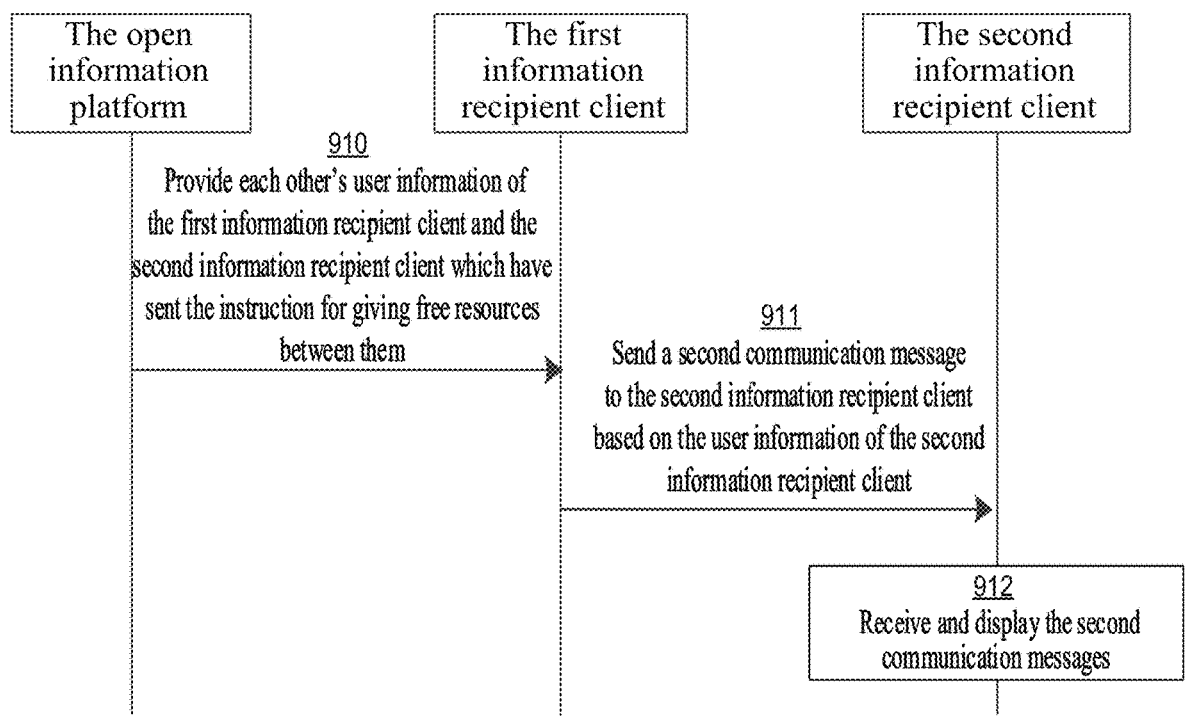
FIG. 10 is a flowchart illustrating the method for resource transfer provided by another example of the present disclosure.

In an optional example, after Step 905, the method further includes Steps 910 to 912, as shown in FIG. 10.

At Step 910, the open information platform provides with a first information recipient client and a second information recipient client which have sent the instruction for giving free resources their user information between each other.

In other words, an information recipient client which has sent the instruction for giving free resources may receive and display the user information of another information recipient client which has sent the instruction for giving free resources, and its display user interface is similar with that shown in FIG. 4C.

Correspondingly, the first information recipient client receives and displays the user information of the second information recipient client.

At Step 911, the first information recipient client sends a second communication message to the second information recipient client based on the user information of the second information recipient client.

If the first information recipient Mr. Zhang wants to communicate deeper with the second information recipient Mr. Li, Mr. Zhang sends the second communication message of "Mr. Li, you do feel it is good ah?" to the second information recipient client of Mr. Li through the first information recipient client. The second communication message is forwarded through the open information platform to the second information recipient client.

At Step 912, the second information recipient client receives and displays the second communication messages.

The second information recipient client of Mr. Li may also continue to make a response and communicate based on the second communication messages.

In an optional example, the second communication message and the reply message can only be received and displayed by the first information recipient client 160 and the second information recipient client 160. But in another optional example, the second communication information and the reply message, at the same time, are further sent to the information publisher client 120 and the other information recipient clients 160 which have sent the instruction for giving free resources to be displayed thereon. That is, the information publisher client 120 and the other information recipient clients 160 which have sent the instruction for giving free resources may also receive and display the information interaction between the first information recipient client 160 and the second information recipient client 160.

Figure 11:
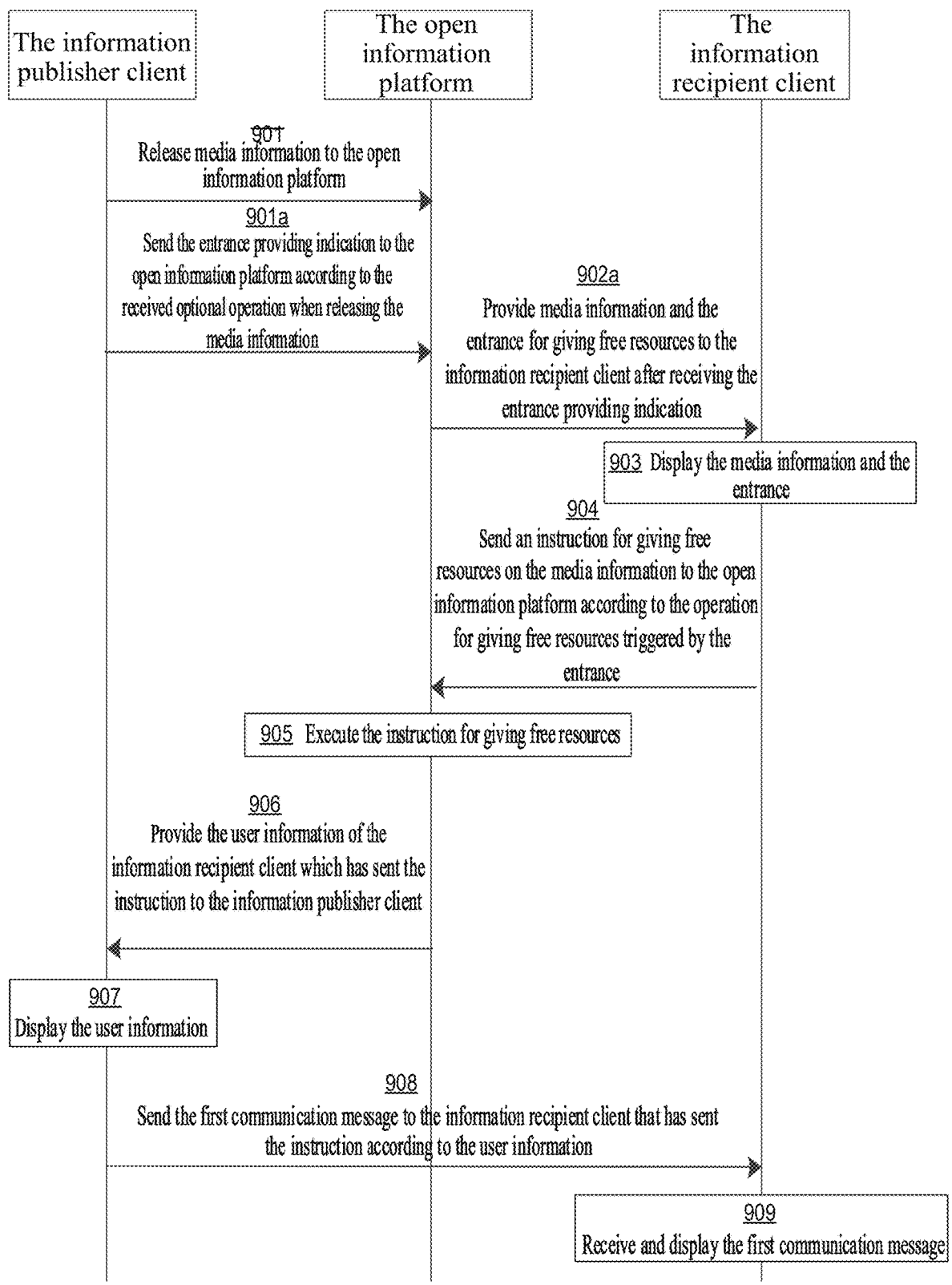
FIG. 11 is a flowchart illustrating the method for resource transfer provided by another example of the present disclosure.

In another optional example, Step 901a is also included before Step 902, correspondingly, Step 901a may be an alternative step of Step 902 as shown in FIG. 11.

At Step 901a, the information publisher client sends an entrance providing indication to the open information platform according to a received selection operation when releasing the media information.

Figure 4F:
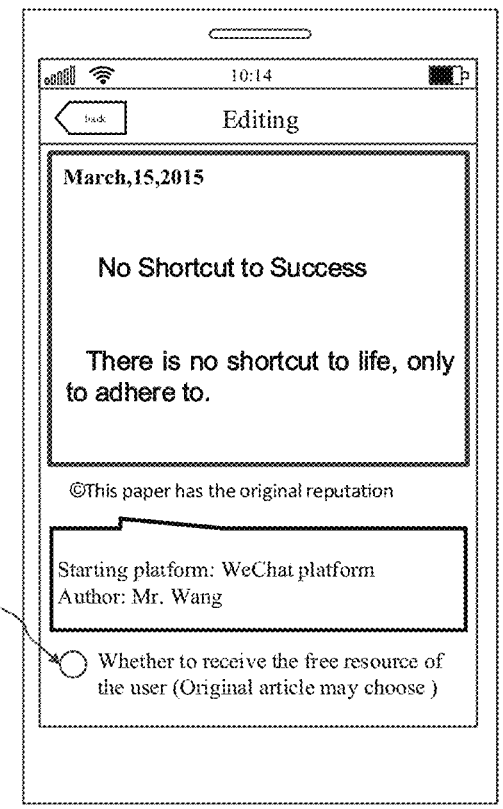

For example, referring to FIG. 4F, the information publisher client 120 displays an optional control 43 when releasing the media information. When the information publisher needs to provide the entrance for giving free resources, he selects the optional control 43, while, when the information publisher does not need to provide the entrance for giving free resources, he does no select the optional control 43. When the optional control 43 is selected, when the information publisher client 120 releases the media information, at the same time, it sends the entrance providing indication to the open information platform 140.

At Step 902a, the open information platform provides the media information and the entrance for giving free resources to the information recipient client after receiving the entrance providing indication.

Without receiving the entrance providing indication, the open information platform only provides the media information only for the information recipient.

Figure 12:
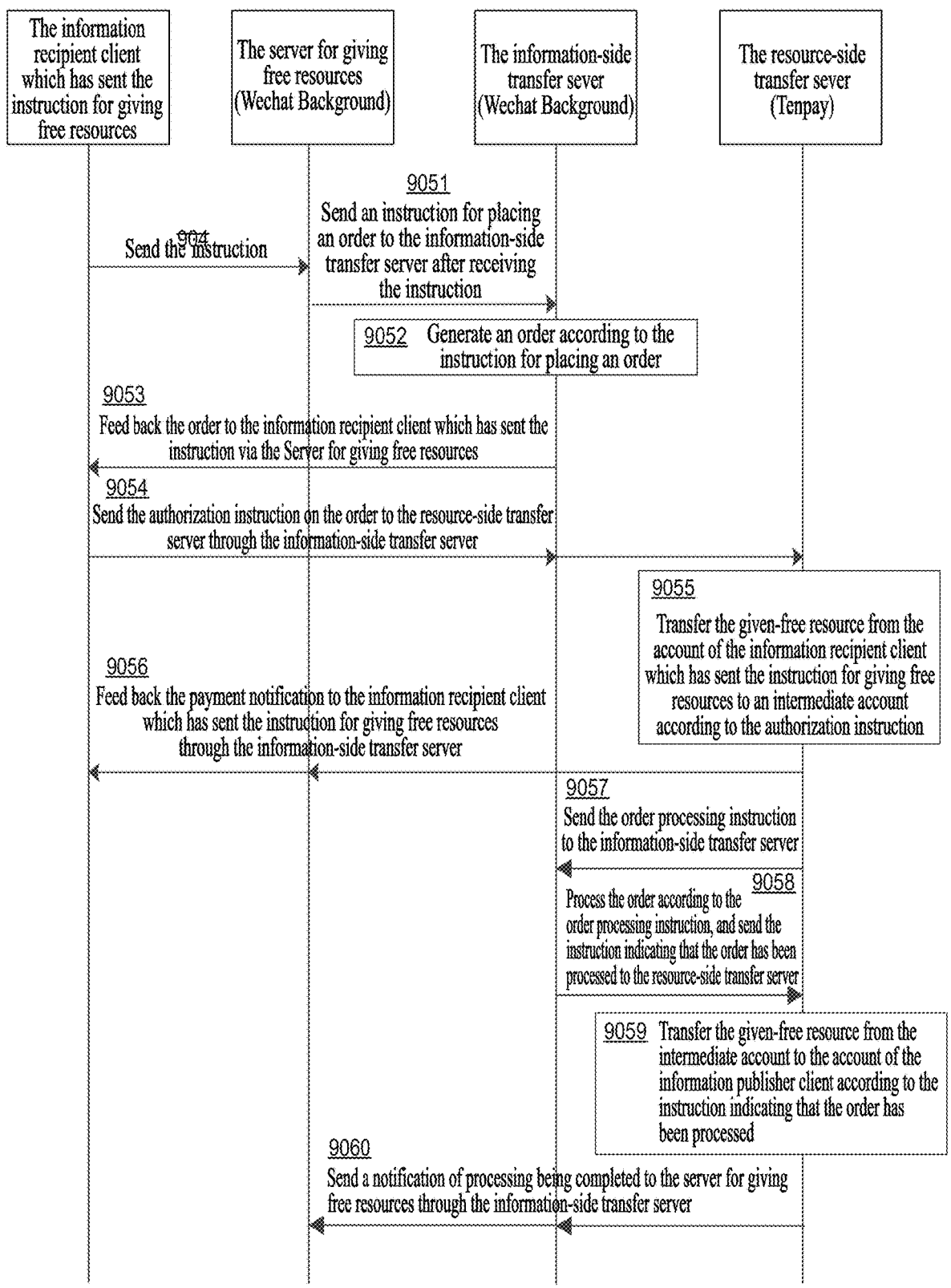
FIG. 12 is a flowchart illustrating the method for resource transfer provided by another example of the present disclosure.

In another optional example, the given-free resource is the cash resource. The open information platform 140 transfers the given-free resource from the account of the information recipient client which has sent the instruction for giving free resources to the account of the information publisher client. When the open information platform 140 includes a server for giving free resources 840, an information-side transfer server 860, and a resource-side transfer server 880, Step 905 includes the following steps as shown in FIG. 12.

At Step 9051, the server for giving free resources sends an instruction for placing an order to the information-side transfer server after receiving the instruction for giving free resources.

The instruction for placing an order includes the amount of a given-free resource (the amount of money), the account of the information publisher client and the account of the information recipient client which has sent the instruction for giving free resources.

Herein, the amount of the given-free resource may be predefined or defined by the information recipient.

At Step 9052, the information-side transfer server generates an order according to the instruction for placing an order.

The order is for transferring the given-free resource from the account of the information recipient client which has sent the instruction for giving free resources to the account of the information publisher client in real time.

At Step 9053, the information-side transfer server feeds back the order to the information recipient client which has sent the instruction for giving free resources through the server for giving free resources.

The information recipient client displays the order.

At Step 9054, the information recipient client sends an authorization instruction for the order to the resource-side transfer server through the information-side transfer server.

The authorization instruction is used for authorizing the resource-side transfer server to complete resource transfer for the order.

Figure 13:
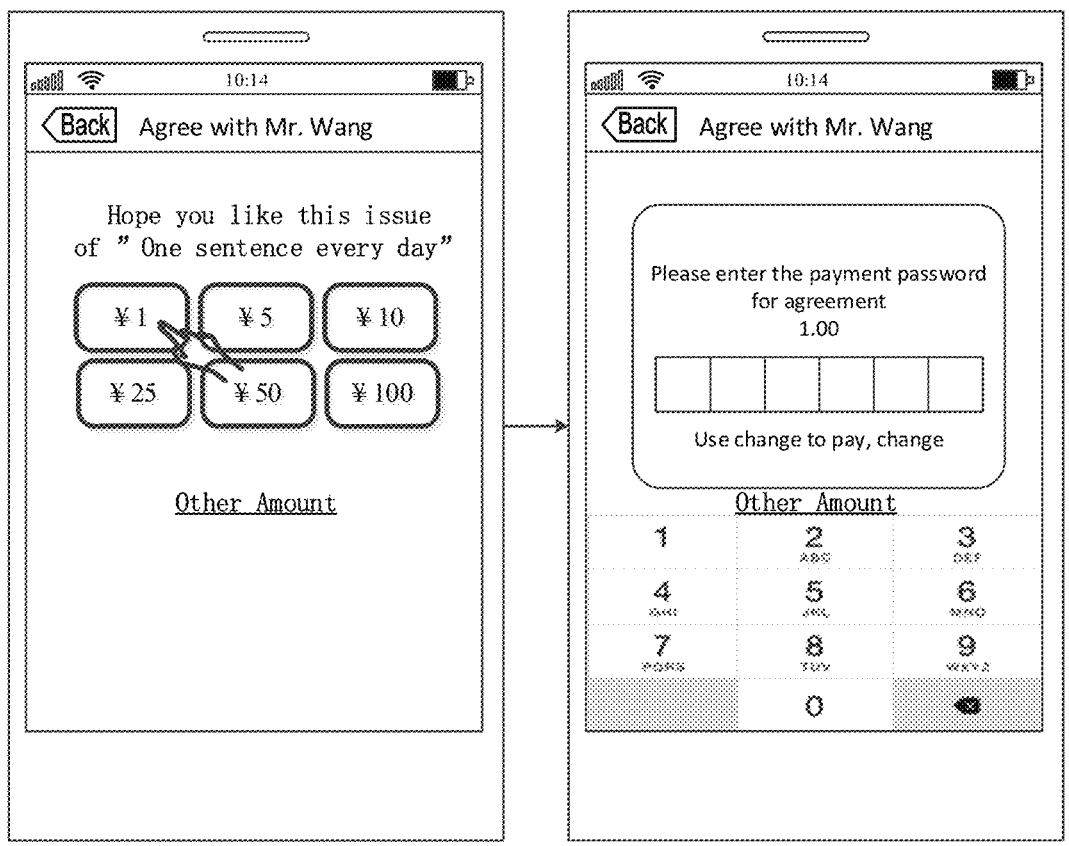
FIG. 13 is a diagram illustrating a user interface when the method for resource transfer provided in the example shown in FIG. 12 is on working.

The authorization instruction usually includes a payment password, and a process of entering the payment password is shown in FIG. 13.

At Step 9055, the resource-side transfer server transfers the given-free resource from the account of the information recipient client which has sent the instruction for giving free resources to an intermediate account according to the authorization instruction.

The intermediate account is a corresponding account at the resource-side transfer server of the information-side transfer server.

At Step 9056, the resource-side transfer server feeds back a payment notification to the information recipient client which has sent the instruction for giving free resources through the information-side transfer server.

This step is optional and is to inform the information recipient client that the account transfer is in success.

At Step 9057, the resource-side transfer server sends an order processing instruction to the information-side transfer server.

At Step 9058, the information-side transfer server processes the order according to the order processing instruction, and sends an instruction indicating that the order has been processed to the resource-side transfer server.

At Step 9059, the resource-side transfer server transfers the given-free resource from the intermediate account to the account of the information publisher client according to the instruction indicating that the order has been processed.

At Step 9050, the resource-side transfer server sends a notification of processing being completed to the server for giving free resources through the information-side transfer server.

Till now, the open information platform transfers the given-free resource from the account of the information recipient client which has sent the instruction for giving free resources to the account of the information publisher client in real time.

In an exemplary example, a non-transitory computer readable storage medium including instructions is further provided, for example, there is a memory including instructions, the instructions can be executed by a processor of a terminal in order to complete various steps of the information publisher client or various steps of the information recipient client mentioned in the examples above; or, the instructions can be executed by a processor of a server to complete the various steps of the open information platform in the examples above. For example, the non-transitory computer readable storage medium may be ROM, random access memory (RAM), CD-ROM, magnetic tape, floppy disk, optical data storage devices and so on.

The serial numbers of the examples of the present disclosure are just for sake of description but not represent advantages and disadvantages of the examples.

The ordinary persons skilled in the art can understand that all or part of the steps of the examples may be accomplished through hardware, or through the related hardware instructed by a program, the program may be stored in a computer readable storage medium, the storage medium mentioned above may be read only memory (ROM), disk or CD, and so on.

The foregoing is only preferred examples of the present disclosure, which is not for use in limiting the present disclosure. Any modifications, equivalent substitutions and improvements made within the spirit and principles of the present disclosure, should be covered by the protection scope of the present disclosure.

The invention claimed is:

1. A method for resource transfer, applied to a first client, the method comprising:
    displaying media information which is shared by a Social Networking Service (SNS) platform and released by a second client;
    displaying an entrance for giving free resources provided by the SNS platform; and
    in response to an operation for giving free resources triggered through the entrance, sending an instruction for giving free resources for the media information to the SNS platform which generates an order after receiving the instruction for giving free resources, wherein the order is to transfer the given-free resource from the account of the first client to the account of the second client, feeds back the order to the first client, receives from the first client an authorization instruction on the order and forwards the authorization instruction to a resource-side transfer server, wherein the authorization instruction is to authorize the resource-side transfer server to complete resource transfer of the order, receives an order processing instruction from the resource-side transfer server which is issued after the resource-side transfer server transferring the given-free resource from the account of the first client to an intermediate account according to the authorization instruction, and processes the order according to the order processing instruction, and sends an instruction indicating that the order has been processed to the resource-side transfer server to enable the resource-side transfer server to transfer the given-free resource from the intermediate account to the account of the second client.

2. The method according to claim 1, further comprising:
    receiving the order from the SNS platform wherein the order is generated in response to receiving the instruction for giving free resources;
    sending the authorization instruction on the order to the resource-side transfer server through the SNS platform; and
    receiving a notification from the resource-side transfer server through the SNS platform.

3. The method according to claim 1, further comprising:
    receiving a communication message from a third client through the SNS platform wherein the third client has sent the instruction for giving free resources for the media information; and
    displaying the communication message.

4. The method according to claim 1, further comprising:
    receiving from the SNS platform user information of one or more third clients having sent the instruction for giving free resources for the media information; and
    sending a communication message to one of the one or more third clients through the SNS platform.

5. A method for resource transfer, applied to a Social Networking Service (SNS) platform, the method comprising:
    receiving media information from a first client;

publishing the media information;
providing an entrance for giving free resources for a second client when the second client displays the media information;
receiving an instruction for giving free resources for the media information from the second client which is issued by the second client in response to an operation for giving free resources triggered through the entrance; and
in response to the instruction for giving free resources for the media information, transferring a given-free resource from an account of the second client to an account of the first client through a resource-side transfer server;
wherein a process of transferring a given-free resource from an account of the second client to an account of the first client, comprises:
generating an order after receiving the instruction for giving free resources, wherein the order is to transfer the given-free resource from the account of the second client to the account of the first client;
feeding back the order to the second client;
receiving from the second client an authorization instruction on the order and forwarding the authorization instruction to the resource-side transfer server, wherein the authorization instruction is to authorize the resource-side transfer server to complete resource transfer of the order;
receiving an order processing instruction from the resource-side transfer server which is issued after the resource-side transfer server transferring the given-free resource from the account of the second client to an intermediate account according to the authorization instruction; and
processing the order according to the order processing instruction, and sending an instruction indicating that the order has been processed to the resource-side transfer server to enable the resource-side transfer server to transfer the given-free resource from the intermediate account to the account of the first client.

6. The method according to claim 5, wherein, the method further comprises:
providing user information of the second client for the first client; and
receiving a first communication message from the first client and forwarding the first communication message to the second client according to the user information.

7. The method according to claim 5, wherein, the method further comprises:
providing with the second client user information of one or more third clients having sent the instruction for giving free resources for the media information;
receiving from the second client a second communication message for one of the one or more third clients; and
forwarding the second communication message to the third client according to the user information of the third client.

8. The method according to claim 5, wherein, the method further comprises:
receiving an entrance providing indication from the first client; and
providing the entrance for giving free resources of the media information for the second client after receiving the entrance providing indication.

9. A terminal device of a first client, comprising:
one or more processors; and
one or more memories storing instructions that, when executed by the one or more processors, cause the first client in the terminal device to perform the following processes:
displaying media information which is shared by a Social Networking Service (SNS) platform and released by a second client;
displaying an entrance for giving free resources provided by the SNS platform; and
in response to an operation for giving free resources triggered through the entrance, sending an instruction for giving free resources for the media information to the SNS platform which generates an order after receiving the instruction for giving free resources, wherein the order is to transfer the given-free resource from the account of the first client to the account of the second client, feeds back the order to the first client, receives from the first client an authorization instruction on the order and forwards the authorization instruction to a resource-side transfer server, wherein the authorization instruction is to authorize the resource-side transfer server to complete resource transfer of the order, receives an order processing instruction from the resource-side transfer server which is issued after the resource-side transfer server transferring the given-free resource from the account of the first client to an intermediate account according to the authorization instruction, and processes the order according to the order processing instruction, and sends an instruction indicating that the order has been processed to the resource-side transfer server to enable the resource-side transfer server to transfer the given-free resource from the intermediate account to the account of the second client.

10. The terminal device according to claim 9, wherein, when executed by the one or more processors, the instructions further cause the first client in the terminal device to perform the following processes:
receiving the order from the SNS platform wherein the order is generated in response to receiving the instruction for giving free resources;
sending the authorization instruction on the order to the resource-side transfer server through the SNS platform; and
receiving a notification from the resource-side transfer server through the SNS platform.

11. The terminal device according to claim 9, wherein, when executed by the one or more processors, the instructions further cause the first client in the terminal device to perform the following processes:
receiving a communication message from a third client through the SNS platform wherein the third client has sent the instruction for giving free resources for the media information; and
displaying the communication message.

12. The terminal device according to claim 9, wherein, when executed by the one or more processors, the instructions further cause the first client in the terminal device to perform the following processes:
receiving from the SNS platform user information of one or more third clients having sent the instruction for giving free resources for the media information; and
sending a communication message to one of the one or more third clients through the SNS platform.

13. A Social Networking Service (SNS) platform, comprising:
one or more processors; and one or more memories storing instructions that, when executed by the one or more processors, cause the SNS platform to perform the following processes:

receiving media information from a first client;

publishing the media information;

providing an entrance for giving free resources for a second client when the second client displays the media information;

receiving an instruction for giving free resources for the media information from the second client which is issued by the second client in response to an operation for giving free resources triggered through the entrance; and in response to the instruction for giving free resources for the media information, transferring a given-free resource from an account of the second client to an account of the first client through a resource-side transfer server;

wherein a process of transferring a given-free resource from an account of the second client to an account of the first client, comprises:

generating an order after receiving the instruction for giving free resources, wherein the order is to transfer the given-free resource from the account of the second client to the account of the first client;

feeding back the order to the second client;

receiving from the second client an authorization instruction on the order and forwarding the authorization instruction to the resource-side transfer server, wherein the authorization instruction is to authorize the resource-side transfer server to complete resource transfer of the order;

receiving an order processing instruction from the resource-side transfer server which is issued after the resource-side transfer server transferring the given-free resource from the account of the second client to an intermediate account according to the authorization instruction; and processing the order according to the order processing instruction, and sending an instruction indicating that the order has been processed to the resource-side transfer server to enable the resource-side transfer server to transfer the given-free resource from the intermediate account to the account of the first client.

14. The SNS platform according to claim 13, wherein, when executed by the one or more processors, the instructions further cause the SNS platform to perform the following processes:

providing user information of the second client for the first client; and receiving a first communication message from the first client and forwarding the first communication message to the second client according to the user information.

15. The SNS platform according to claim 13, wherein, when executed by the one or more processors, the instructions further cause the SNS platform to perform the following processes:

providing with the second client user information of one or more third clients having sent the instruction for giving free resources for the media information;

receiving from the second client a second communication message for one of the one or more third clients; and forwarding the second communication message to the third client according to the user information of the third client.

16. The SNS platform according to claim 13, wherein, when executed by the one or more processors, the instructions further cause the SNS platform to perform the following processes:

receiving an entrance providing indication from the first client; and providing the entrance for giving free resources of the media information for the second client after receiving the entrance providing indication.

17. One or more non-transitory computer-readable storage media storing computer-executable instructions that, when executed by one or more processors of a terminal device, cause the terminal device to perform the method of claim 1.

18. One or more non-transitory computer-readable storage media storing computer-executable instructions that, when executed by one or more processors of a Social Networking Service (SNS) platform, cause the SNS platform to perform the method of claim 5.

* * * * *